Figure 1:
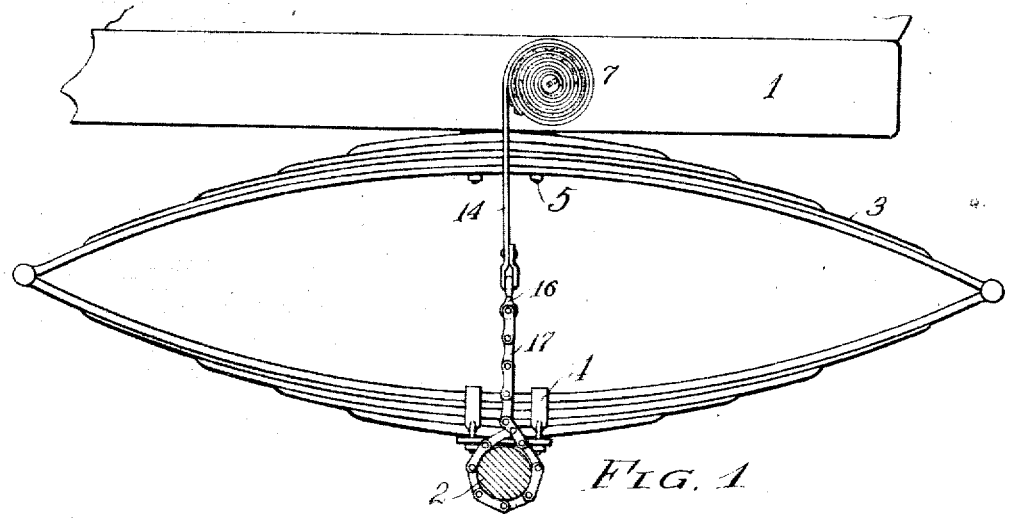

C. H. FOSTER.
SHOCK ABSORBING DEVICE.
APPLICATION FILED APR. 9, 1908.

1,017,660.

Patented Feb. 20, 1912.

WITNESSES:
Arthur S. Remsberg
Brennan B. West

INVENTOR,
Claud H. Foster
BY Bates, Fouts & Hull,
ATTYS.

UNITED STATES PATENT OFFICE.

CLAUD H. FOSTER, OF CLEVELAND, OHIO.

SHOCK-ABSORBING DEVICE.

1,017,660.  Specification of Letters Patent.  Patented Feb. 20, 1912.

Application filed April 9, 1908. Serial No. 426,144.

*To all whom it may concern:*

Be it known that I, CLAUD H. FOSTER, a citizen of the United States, residing at Cleveland, in the county of Cuyahoga, and State of Ohio, have invented a certain new and useful Improvement in Shock-Absorbing Devices, of which the following is a full, clear, and exact description, reference being had to the accompanying drawings.

This invention relates to shock absorbers, interposed between relatively movable parts, and more especially to brakes or shock-absorbing devices which are employed with vehicles for the purpose of reducing the extent of vibration between the axles and bodies of the same, to prevent injury to the springs and to overcome unpleasant and injurious vibrations of the vehicle bodies.

The invention has for an object the production of a device of this character which is extremely simple in construction and efficient in operation, which may be easily assembled and quickly applied to and removed from the parts with which it may be associated, and which will be durable in operation.

Generally speaking, the invention may be defined as consisting of the combinations of elements embodied in the claims hereto annexed and illustrated in two modifications in the drawings forming part hereof, wherein—

Figures 2, 3, 4:
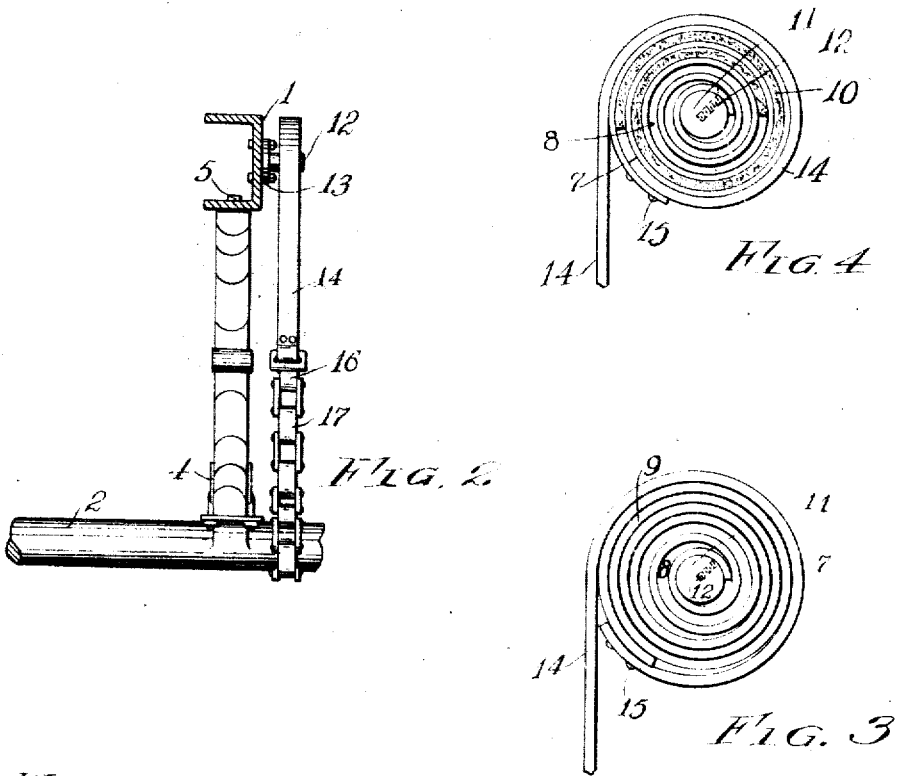

Figure 1 represents a side elevation of the lower part of a vehicle body having my invention applied thereto, the axle being represented in section; Fig. 2 represents a sectional view through a portion of the frame of the vehicle, showing the spring. axle and my device in elevation; Fig. 3 represents an enlarged side elevation of one form of the shock absorbing device; and Fig. 4 represents a similar view of a modified form of such device.

The device consists of a spiral or convolute spring, one end of which is operatively connected to one of the moving parts with which it is to be associated and the other end of which is operatively connected with the other moving part with which it is to be associated, the convolutions of the spring being given a particular arrangement whereby certain of the convolutions normally grip each other; that is to say, said convolutions grip each other when the spring is not connected to the aforesaid moving parts. The convolutions which grip each other will, upon any movement tending to separate the said parts, exert a dragging frictional action upon adjacent convolutions which will increase as the said parts separate. In the constructions shown in the drawings, the spring is given such a shape that the outer convolutions are normally in gripping engagement, either directly or indirectly, while the innermost convolutions are open or separated. With the spring constructed as thus illustrated and described, it will be apparent that any movement tending to close or contract the spring will be resisted by the frictional engagement between the outer convolutions, the outer convolutions engaging in such manner as to produce a dragging friction of said outer convolutions on the next adjacent inner convolutions, which friction increases as the outer end of the coil is operated to contract the coil. This dragging friction produces a yielding resistance to the separation of the parts with which the spring may be connected, which yielding resistance is transmitted gradually to the central open portion of the spring, with the result that such central portion is enabled to absorb shocks or strains applied to the outer portion of the spring without injury to such inner portion.

In Figs. 1 and 2 of the drawing, my device is shown as applied to a vehicle for the purpose of preventing violent separation of the frame and axle on rebound, thereby preventing the breaking of the vehicle springs and insuring ease and comfort of riding.

In the drawings, 1 denotes one of the side frames of the vehicle, the same being shown as a channel beam. 2 denotes the axle and 3 one of the springs, the form illustrated being a full elliptic spring having its lower section connected to the axle by means of clips 4 in the usual manner and having its upper section connected to the lower flange of the channel beam, as by means of bolts 5. 7 denotes the spiral or convolute spring which I interpose between the vehicle frame and the axle. When connected to the vehicle members, the inner convolutions of the spring are under compression but are open or separated, as shown at 8, but the outer convolutions are given such shape that they are in gripping engagement, as shown at 9. In the specific form of my invention shown in Figs. 1 and 4, the spring is constructed in the same general manner as shown in Fig. 3, but, for the purpose of increasing the friction between the outer convolutions when the outer end of the spring is subjected to a strain tending to contract the spring, there is interposed between some of the outermost convolutions a packing 10. This packing may be made of belting or any other suitable material. The spring will be constructed in the same general manner as the spring shown in Fig. 3, filling the space between the outer convolutions with the packing referred to. The packing increases the dragging frictional resistance to the closing movements of the outer portion of the spring. In both forms of the invention, however, some of the outer convolutions are in gripping engagement, either in direct engagement, as shown in Fig. 3, or in indirect engagement, as shown in Figs. 1 and 4.

The inner end of the spring will be operatively connected to one of the vehicle members, either the axle or the frame. In the drawings, it is shown as connected to the frame by means of a stud 11, to which the inner end of the spring is secured, as by means of a threaded bolt 12. The stud 11 may be conveniently secured to the frame 1 by having formed therewith a flange 13, by means of which it may be bolted to the frame. As a convenient means for securing the outer end of the spring to the axle, I may secure a flexible connection, as a strap 14, to the outer end of the spring by means of rivets 15, connecting the lower end of said strap to the axle in any preferred manner. In the drawings, I have shown the strap as provided with a connection 16 at the lower end thereof adapted to be applied to a length of chain 17 extending around the axle. The strap will preferably be wound around the outer convolution of the spring.

In applying my device to a vehicle, the spring should be placed under further compression to obtain the best results, such compression being proportional to the movement of the vehicle spring from its normal position to its fully deflected or elongated position. For instance, should a vertical movement of seven inches be necessary to fully elongate spring 3, then the flexible connection 14 should be drawn down a distance of seven inches against the action of spring 7 before connecting it to the axle. In this manner, spring 7 will always be under compression and will take up the slack of the flexible member whenever spring 3 is compressed. The length of the flexible connection 14 can be easily adapted for varying styles of vehicle springs.

With the parts arranged as described, the operation will be apparent.

Any movement tending to separate the frame and axle will be yieldingly and increasingly resisted by the frictional drag between the outer convolutions of the spring, and such movement will be gradually transmitted to the open or central portion of the spring, which will effectually absorb the shocks imparted to the outer end of said spring. Furthermore, as the axle and frame approach each other, the spring will expand and take in the slack of flexible connection 14. The device is extremely simple of construction, may be quickly applied to and removed from the parts with which it is to be used, and is durable and efficient in operation.

Having thus described my invention, I claim:

1. The combination, with a pair of relatively movable members, of a shock absorbing device, said device comprising a spiral spring having an open central portion operatively connected to one of such members and having its outer portion flexibly connected with the other member, and friction material interposed between some of the outer convolutions of said spring.

2. The combination, with a pair of relatively movable members, of a shock absorbing device interposed therebetween, said device comprising a stud fixedly connected to one of said members, a spiral spring having its central portion connected with said stud and having its inner convolutions spaced apart, friction material interposed between the outer convolutions of said spring, and a flexible connection secured to the outer portion of said spring and extending around the outermost convolution thereof and connected to the other member.

3. The combination, with a pair of relatively movable members, of a shock absorbing device comprising a spiral spring having its inner portion operatively connected with one of such members and having some of the convolutions thereof normally in gripping engagement and other convolutions normally out of gripping engagement, and a connection between the outer portion of said spring and the other member.

4. The combination, with a pair of relatively movable members, of a shock absorbing device comprising a spiral spring having a relatively open central portion, the inner convolutions being normally out of engagement and the outermost convolutions being normally in gripping engagement with each other, means operatively connecting the central portion of the spiral spring with one of such members, and a flexible connection between the outermost convolution of the spring and the other member.

5. The combination, with a vehicle frame and axle, of a shock absorbing device comprising a spiral spring having a relatively open central portion the convolutions whereof are normally out of engagement, said spring having its outer convolutions normally in gripping engagement with each other, means operatively connecting the central portion of the spring with one of the vehicle members, and a flexible connection between the outermost convolution of the spring and the other vehicle member, said connection being under tension and said spring under compression when the vehicle spring is nearly fully compressed.

6. The combination, with a pair of relatively movable members, of a shock absorbing device comprising a spiral spring having a relatively open central portion the convolutions whereof are normally out of engagement, said spring having two or more of its outer convolutions normally in gripping engagement with each other, means operatively connecting the central portion of the spring with one of the members, and a strap wrapped around the outermost convolution of the spring and connected to the other member.

7. The combination, with a vehicle frame and axle, of a shock absorbing device comprising a spiral spring the central portion whereof is open and the outer convolutions whereof are in gripping engagement, a connection between one end of said spring and the axle, and means connecting the other end of the spring to the frame at a point above the axle.

8. The combination, with a vehicle frame and axle, of a shock absorbing device comprising a spiral spring having an open central portion, a connection between one end of said spring and the axle, means connecting the other end of the spring to the frame at a point above the axle, and friction material interposed between some of the outer convolutions of the spring.

In testimony whereof, I hereunto affix my signature, in the presence of two witnesses.

CLAUD H. FOSTER.

Witnesses:
A. S. HULL,
J. B. HULL.